Oct. 14, 1924.
E. R. BURTNETT
INTERNAL COMBUSTION ENGINE
Filed April 17, 1924   3 Sheets-Sheet 1
1,511,707
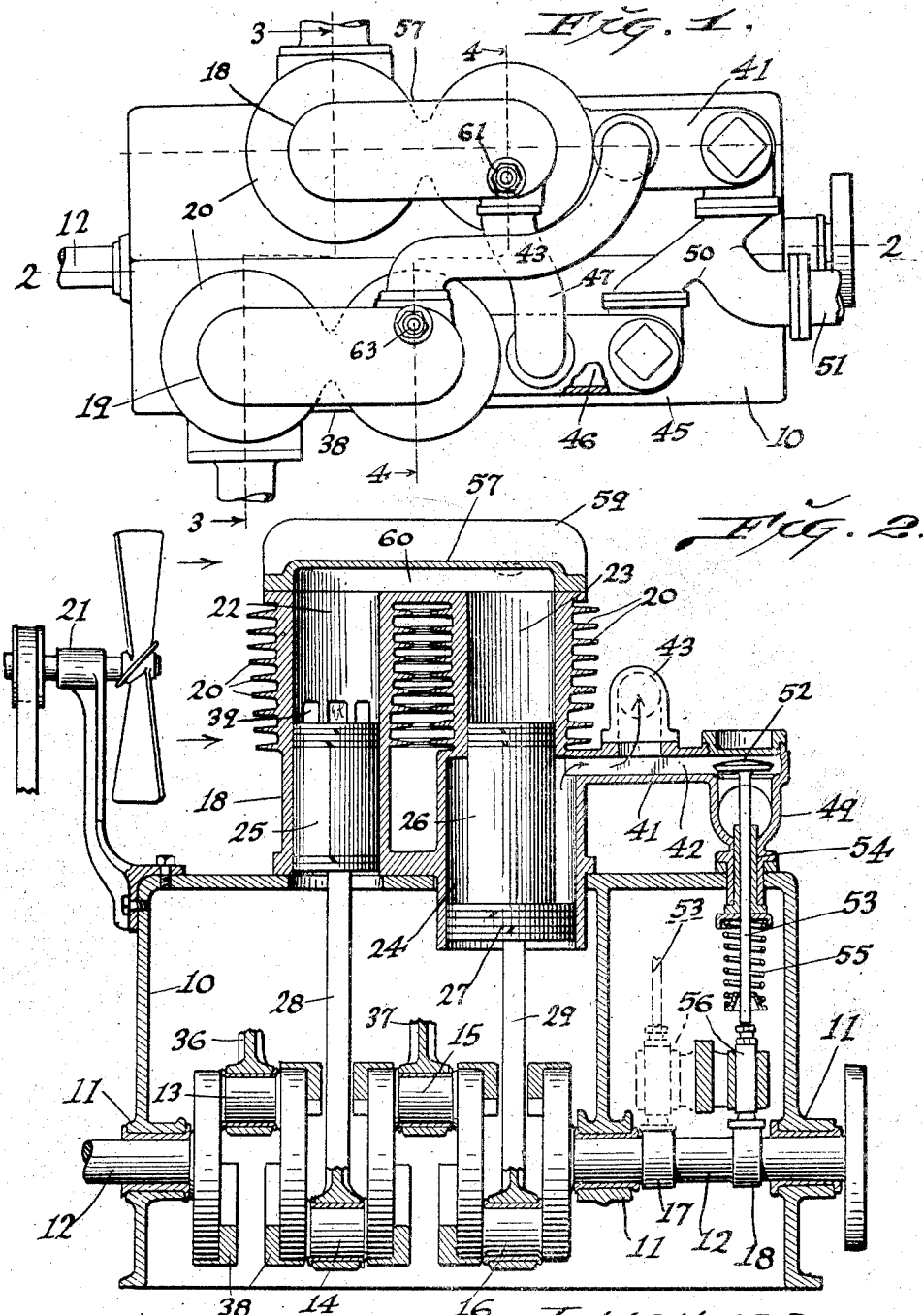
INVENTOR,
EVERETT R. BURTNETT.
By Martin P. Smith, ATTY.

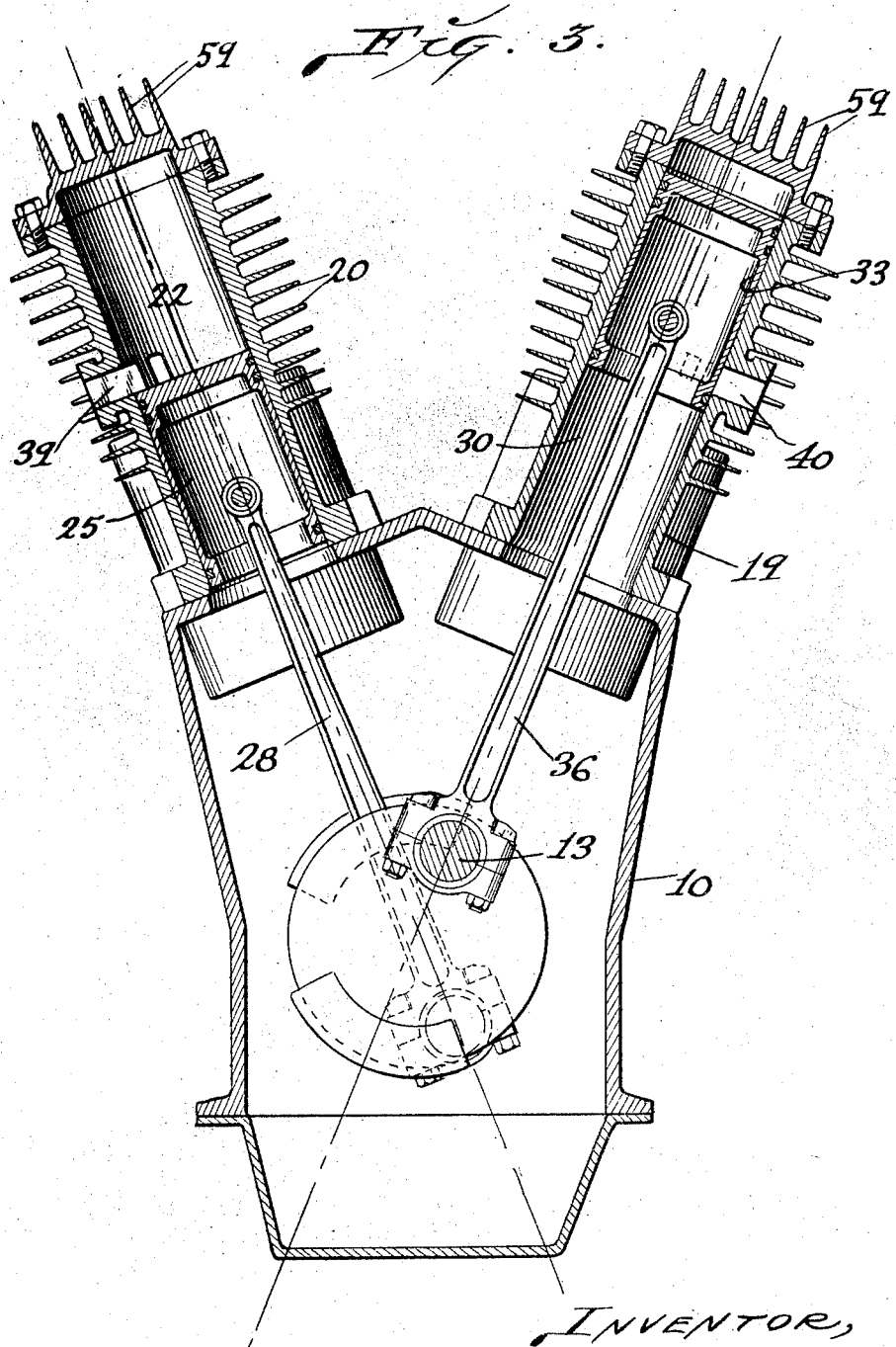

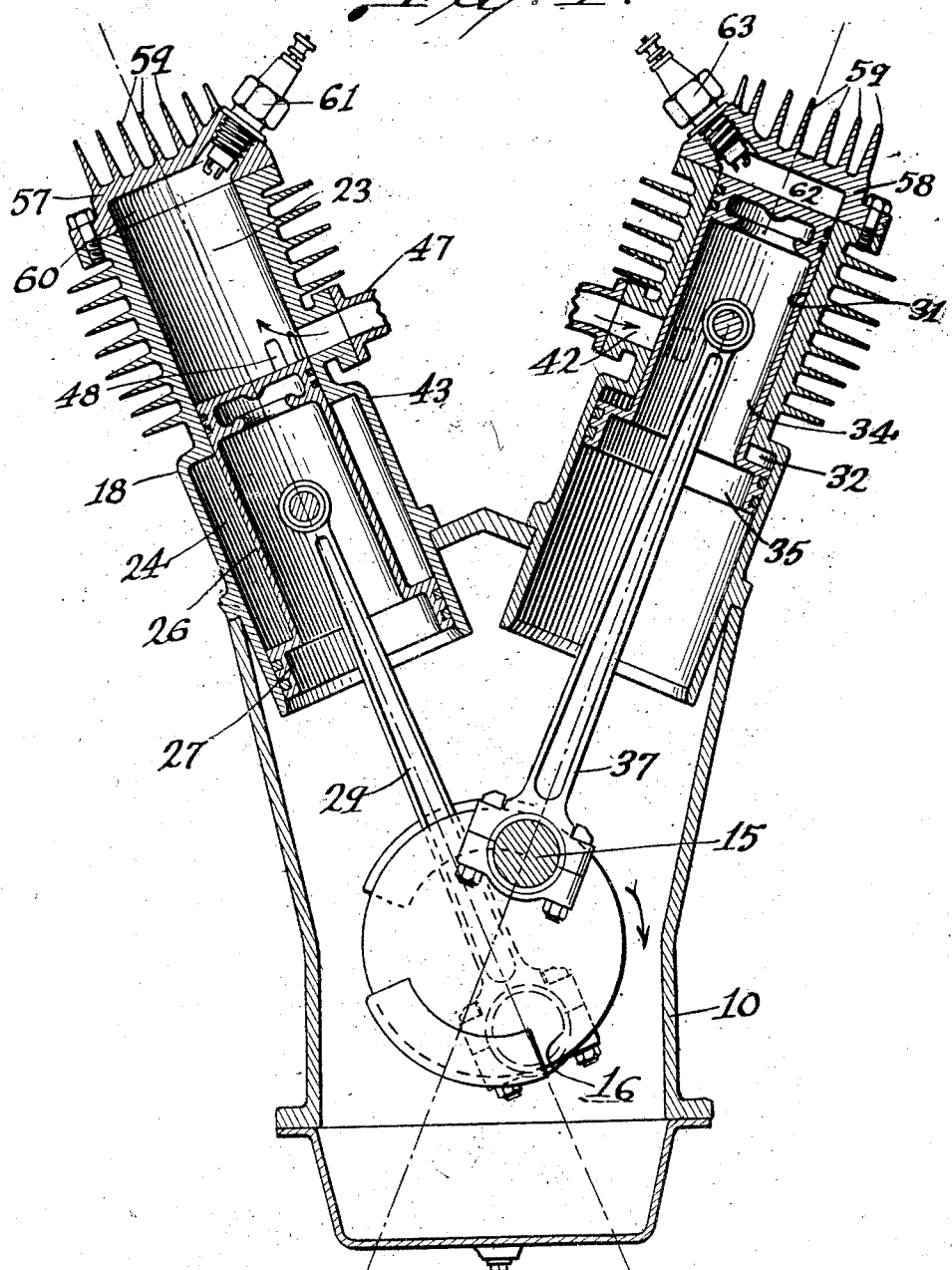

Patented Oct. 14, 1924.

1,511,707

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed April 17, 1924. Serial No. 707,103.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates to internal combustion engines of the two stroke cycle type, the principal objects of my invention being to provide, in an engine of the character referred to, an improved design for direct air cooling, an improvement in cylinder arrangement and improved means for effecting charge induction.

It will be understood by those familiar with the art of internal combustion engine design and especially direct air cooled engines, that where high compression is attained, the problem of cooling the engine is difficult, since the combustion temperature increases with the increase of compression pressure where the engine operates on the four stroke cycle principle and the radiating surface is limited to the fin area, which can be applied to a single cylinder combustion chamber compatible with free air flow.

In my improved engine, as herein described, it will be seen that the fin area is greatly increased with respect to the piston displacement of a given content, owing to the fact that the displacement is divided between two cylinders joined by one common compression and combustion clearance chamber, and each two cylinder combustion chamber forming a wing, of a V-shaped engine structure that permits a free circulation and flow of cooling air over the combustion units equally alike.

I propose to provide the forward cylinder of each two cylinder combustion chamber, or the cylinder that is first in the path of cooling air flow, with the exhaust ports so that the heat that is added to this cylinder of the pair and which serves as the exhaust port cylinder, by the hot residual gas flow will be favored by the cooling air first striking it.

The second cylinder of each two cylinder combustion chamber has a two diameter bore and a two diameter piston thus creating an annular chamber which I have adapted to the precompression or fuel charge pumping function. This second cylinder is also provided with ports in the wall of its external cooling air flow and the induction of the precompressed fuel charge. These two functions, namely, the pumping of the cool fresh charge by the lower part of the piston of the second cylinder in the path of the external cooling air flow and the induction of the cool, precompressed fresh fuel charge over the piston head of the same cylinder adds materially to the cooling of the second cylinder.

The integral fins that join the two combustion cylinders of each unit, permits an equalization of the heat, in the event that one cylinder tends to become heated to a greater temperature than the other.

My invention also contemplates a removable cylinder head having a compression and combustion clearance chamber that is common to the members forming the pair of combustion cylinders of each unit. Such construction permits the machining of the entire periphery of the clearance chamber, which is also very favorable to air cooling since a polished surface attracts less heat than a rough surface, and the integral cylinder head, in turn, dissipates any variation of heat from one end to the other, if there should be a variation in the heat of the contents of the chamber over the two cylinders during combustion.

A further object of my invention is, to provide a four throw crank shaft with the cranks to the respective cylinders so arranged circumferentially, that the power sequences are of uniform intervals irrespective of the degree of angularity between the two sets of combustion cylinders for, by so doing, I have provided an equal counter travel of the reciprocatory inertia forces, I accomplish this, by arranging the two cranks of the two cylinders forming the V-wing last in the direction of crank shaft rotation in advance of the diametrically opposite position of the two cranks of the two cylinders forming the V-wing first in direction of crank shaft rotation, whatever number of degrees of angularity is between the two V-wings of cylinders. This arrangement permits the movement of the pistons within the two cylinders of each V-wing in exactly opposite directions and consequently balancing the reciprocative elements.

It will be seen, that the two pistons within the two cylinders of each combustion unit are of different size, owing to one of the cylinders and pistons being of a two diameter construction in order to accomplish the charge pumping function, but the cranks to which these two V pistons of variable size and weight are on the same axial line. Hence, these two pistons move together and they are countered equally, by the movement of the other pair of pistons moving in an exactly opposite direction and, at the same time in relation to the two opposite dead center positions.

Any suitable counter weight may be formed integral with or attached to the crank shaft diametrically opposite the out of balance weight as found by the herein described arrangement of the four cranks of the crank shaft to balance the whole rotary mass.

A further object of my invention is to provide a gaseous fuel inlet valve for each annular chamber formed between the two diameters of the piston and cylinder adapted to charge pumping, for the admission of the fuel charge for the full duration of the suction stroke of the respective piston and further; to provide means for actuating the valve by a cam integral with or removably arranged on the rear portion of the crank shaft and to the rear of the crank throws and, further to provide an arrangement of cross ducts for the transfer of the precompressed gaseous fuel from the pumping chamber of the two diameter cylinder of one V-wing, to the ports formed in the smaller diameter chamber of the two diameter cylinders of the other V-wing.

With the foregoing and other objects in view, my invention consists in certain novel features of construction and arrangement of parts that will be hereinafter more fully described and claimed and illustrated in the accompanying drawings, in which:

Fig. 1 is a top plan view of an engine of my improved construction.

Fig. 2 is a vertical longitudinal section taken on the line 2—2 of Fig. 1.

Fig. 3 is a cross section taken on the line 3—3 of Fig. 1.

Fig. 4 is a cross section taken on the line 4—4 of Fig. 1.

Referring by numerals to the accompanying drawings, which illustrate a practical form of engine embodying the principles of my invention, 10 designates a crank case of suitable form, having bearings 11 for a crank shaft 12 and the latter having four cranks, 13, 14, 15 and 16.

Cranks 13 and 15, which occupy the same longitudinal plane, are disposed angularly with respect to cranks 14 and 16, which latter occupy the same longitudinal plane. Crank shaft 12 is also provided near one end with a pair of poppet valves actuating cams 17 and 18.

Rigidly secured on top of crank case 10 are two cylinder blocks 18 and 19 that are practically identical in size, form and construction. These blocks are positioned at points equidistant from the transverse center of the crank case and they occupy angular positions, so that the axial lines of the chambers within said blocks pass through or intersect the axis of crank shaft 12. Further, the two cylinder blocks are offset with respect to each other longitudinally of the crank case, with blocks 18 disposed slightly to the rear of block 19.

The upper portions of both blocks 18 and 19 are provided with heat radiating fins 20, over which may pass blasts of air from a suitably mounted fan or fans such as 21.

Formed in block 18 are combustion chambers 22 and 23, the axes of which are parallel.

The diameter of the lower portion of chamber 23 is increased so as to provide a gaseous fuel precompression chamber 24 and arranged for reciprocatory movement within the chambers 22 and 23 are, respectively, pistons 25 and 26, the lower portion of the latter being increased in diameter to form a piston member or head 27 that reciprocates within chamber 24 connecting piston 25 with crank 14 is an ordinary connecting rod 28 and in like manner the two diameter piston 26, 27 is connected to crank 16 by a connecting rod 29.

Block 19 is provided with combustion chambers 30 and 31, the diameter of the lower portion of the latter being increased to provide a gaseous fuel compression chamber 32 and arranged for operation within said combustion chambers are, respectively, pistons 33 and 34. The lower portion of piston 34 is increased in diameter to form a piston or head 35 that is arranged for operation in precompression chamber 32.

A connecting rod 36 connects piston 33 to crank 13 and a similar connecting rod 37 connects the two diameter piston 34, 35 with crank 15.

To compensate for the increased weight of the two diameter pistons as compared to the pistons 25 and 33 and to counterbalance the reciprocatory masses comprising the pistons and connecting rods, all of the cranks of the crank shaft are provided with counterbalancing weights 38.

Formed through the side wall of block 18 that surrounds chamber 22 are exhaust ports, the same being located at a point where they will be wholly uncovered and open only when piston 25 is at the lower or outer end of its stroke.

Similar exhaust ports 40 are located in the wall that surrounds combustion chamber 30 in block 19 and the latter ports being located so that they are wholly uncovered, only when piston 33 is at the lower or outer end of its stroke.

Extending rearwardly from that portion of block 18 that is provided with the two diameter chamber is a horizontally disposed housing 41 and the inner end of the chamber 42 therein, communicates directly with the upper end of precompressed chamber 24. A cross transfer duct 43 establishes communication between the intermediate portion of the chamber 42 and a compressed gaseous fuel inlet port 44 that is formed through the wall of block 19 that surrounds the two diameter chamber 31, 32, and at a point where said inlet port will be wholly uncovered and open, only when piston 34 is at the lower or outer end of its stroke.

A similar housing 45 projects rearwardly from block 19 and the inner end of the chamber 46 in said housing communicates directly with the upper end of precompression chamber 32. A cross transfer duct 47 leads from the intermediate portion of chamber 46 to a compressed gaseous fuel duct 48 that is formed through the wall of block 18 surrounding combustion chamber 23 and said inlet port being located so that it is wholly uncovered and open, only when piston 26 is at the lower or outer end of its stroke.

As result of this arrangement of cross over transfer ducts the pumping cylinder in each block functions for precompressing and pumping gaseous fuel into the combustion chambers in the other block.

The outer ends of housings 41 and 45 are provided with depending hollow portions such as 49 and connected thereto are the ends of a duct 50, the intermediate portion of the latter being connected by a suitable duct or tubular fitting 51 to a source of gaseous fuel supply, for instance, a carburetor.

The upper ends of the chambers within housings 49 are provided with seats for poppet valves such as 52, the stems 53 of which pass downward through the lower portions of said housings and through bearings 54 that are located in the top of crank case 10. Associated with these valve stems are springs 55 that act to normally retain the valves 52 upon their seats and the lower ends of said stems are adapted to be engaged by plungers 56 that are mounted to reciprocate in suitably located bearings.

The lower ends of the plungers bear respectively on the peripheries of cams 17 and 18 and the lobes of the latter are formed and arranged so as to retain the valves off their seats and open for practically the entire period or time interval of the outward or suction strokes of the precompression pistons 27 and 35.

Secured to the upper or inner ends of the blocks 18 and 19 are, respectively, head blocks 57 and 58 and formed on the outer surfaces of said blocks are longitudinally disposed heat radiating fins such as 59.

Formed in the under side of block 57 is a shallow recess 60 that serves as a common clearance, compression and combustion chamber and which connects the upper or inner ends of combustion chambers 22 and 23. Seated in this block, preferably at a point directly above the inlet ports 48 into chamber 23 is a spark plug 61.

Block 58 is provided in its underface with a shallow recess 62 that connects the combustion chambers 33 and 34 and therefore serves as a common clearance, compression and combustion chamber. Seated in this head, preferably at a point directly above the inlet ports 44 into chamber 34 is a spark plug 63.

In order to provide for an equal counter travel of the reciprocatory inertia forces in my improved engine, so that the power sequence may occur at uniform intervals, I provide a definite relative angular arrangement between the two sets of cranks 13 and 15, and 14 and 16 and between said cranks and the degrees of angularity between the axes of cylinder blocks 18 and 19. For instance, if the angle between the axes of the cylinder blocks is forty-five degrees, as illustrated in Figs. 3 and 4, and which arrangement is convenient and practical, then cranks 13 and 15, to which the pistons in block 19 are connected are arranged so that, when pistons 33 and 34 are at top center said cranks occupy an angular position that is twenty-two and a half degrees past a true vertical plane that passes through the axis of crank shaft 12 and the cranks 14 and 16 occupy angular positions twenty-two and a half degrees from the vertical plane that passes through the crank shaft axis but on the same side of said vertical plane with the cranks 13 and 15. When so positioned the pistons 25 and 26 that are connected to the cranks 14 and 16 are at their low centers and consequently the two sets of pistons move simultaneously, at uniform speed in opposite directions.

Inasmuch as the two sets of cranks occupy angular positions twenty-two and a half degrees away from and on the same side of a true plane that passes through the axis of the crank shaft, it necessarily follows that said two sets of cranks are arranged one hundred and thirty-five degrees apart.

In the operation of my improved two stroke cycle engine, it will be understood that the two sets of pistons operate in identically the same manner but that as the pistons in one leg of the V-structure move upwardly or inwardly the two pistons on the opposite side of the V-structure move downwardly or outwardly.

Assuming that pistons 25 and 26 are passing high center after having compressed a charge of gaseous fuel in common clearance chamber 60 and that said compressed charge is ignited by a spark produced between the inner ends of the electrodes of spark plug 61, the expansion following combustion will act equally on the heads of said pistons to drive the same downward on their power stroke and the motion and power thus developed is transmitted through rods 28 and 29 and cranks 14 and 16 to crank shaft 12.

During the downward movement of piston 26 and while piston 27 is moving downward in chamber 24, cam 18 is acting through its plunger 56 to hold the poppet valve at the outer end of chamber 42 off its seat, or in open position, thereby permitting a charge of gaseous fuel to be drawn from supply duct 51 and fitting 50 past the open valve 52 into chamber 42 and from thence said fuel charge passes into pumping chamber 24. As piston 27 reaches low center the corresponding valve 52 closes, thereby cutting off the further inflow of gaseous fuel.

As piston 25 approaches low center, the head of said piston passes exhaust ports 39, which action takes place an instant before the fuel inlet ports 48 into chamber 23 are uncovered, due to the fact that said exhaust ports are slightly higher than said inlet ports and as said exhaust ports are thus uncovered the high pressure prevailing in the combustion chambers 22 and 23 will drop as the spent gases find exist through said exhaust ports.

This exhaust of burnt gases from chambers 22 and 23 will be materially assisted by the inrush of precompressed gaseous fuel from inlet ports 48 into the lower portion of chamber 23 and which action takes place as piston 26 moves to the lower end of its stroke and uncovers said inlet ports.

It will be understood that the precompressed charge of gaseous fuel thus admitted to chamber 23 was compressed in chamber 32 by piston 35 as the latter moved upward in said chamber 32, which latter movement took place while the pistons 25 and 26 were moving downward on their power stroke. Thus the charge of gaseous fuel that was compressed in the upper portions of chamber 32 and in transfer duct 47 is admitted to chamber 23 when ports 48 are uncovered and, as soon as pistons 25 and 26 start on their succeeding upward stroke the ports 48 and 39 will be covered and closed, thereby trapping the charge of gaseous fuel within the combustion chambers, and said fuel charge together with any products of combustion that remain in said chambers will be compressed as the pistons move upward on the compression stroke.

Obviously, as piston 27 moves downward with piston 26 on the power stroke, cam 17 opens the corresponding valve 52 to admit a charge of gaseous fuel into chamber 24 and on the succeeding upward movement of piston 27 this fuel charge will be precompressed and when ports 44 into chamber 31 are uncovered said charge will pass through transfer duct 43 and through said ports 44 into said chamber 31.

While the engine is in operation, fan 21 is constantly driven so as to discharge a constant stream of cooling air over the fins 20 and 59, with the result that the higher degrees of heat developed during engine operation are rapidly dispelled.

The cooling of the engine with blasts of air is rendered particularly effective by the V-arrangement of the two wings containing the combustion cylinders, by reason of the fact that there are but two cylinders in each row and, further, by the particular longitudinal arrangement of the heat radiating fins.

Thus it will be seen that I have provided a two stroke cycle air cooled internal combustion engine that is relatively simple in structure, capable of being easily and cheaply produced, and in which engine the reciprocating masses are perfectly balanced so as to increase efficiency of operation and minimize vibration and wear.

It will be understood that various minor changes may be made in the size, form and construction of my improved two stroke cycle internal combustion engine without departing from the spirit of my invention, the scope of which is set forth in the appended claims.

I claim as my invention:

1. In a two stroke cycle internal combustion engine, four cylinders arranged in a V-structure, with two cylinders in each wing of said structure, a piston within each of the four cylinders, a crank shaft having four cranks, a separate connection between each piston and one of said four cranks, two of the said cranks arranged in one plane, the other two cranks arranged in a second plane, the two cylinders of each V-wing being arranged on centers parallel with the axis of the crank shaft but staggered with relation to the two cylinders in the opposite V-wing, one of the two cylinders comprising each V-wing having a straight diameter, the other cylinder of the pair in each wing having a two diameter bore, the piston within said two diameter cylinder having two diameters, an annular chamber created between the differential diameters of said two diameter cylinders and pistons, a pocket extending outwardly from each annular chamber, a port in the under side of each end pocket, a duct leading to said port for the supply of gaseous fuel, an inlet valve seating downward in the said port, cams located on the crank shaft rearward of the cranks thereof, valve actuating mechanism between the cams and the said inlet valves, an outlet port in the wall of the clearance of the annular chamber of each of the two diameter cylinders, ports formed in the wall of each straight diameter cylinder of each V-unit for the expulsion of the spent products of combustion, ports formed in the wall of the smaller diameter of the two diameter cylinder of each V-unit, a gaseous fuel precompression transfer duct leading from the outlet port of each annular chamber to the ports in the smaller diameter of the two diameter cylinder in the opposite V-cylinder unit, a removable cylinder head common to the two cylinders comprising each V-wing, a compression and combustion clearance chamber formed in the head and joining the said two cylinders in each V-unit into one common combustion chamber, ignition means located in the said removable cylinder head directly over the gaseous fuel ports formed in the wall of the cylinder of each pair of cylinders in each V-unit and having the smaller diameter and being a part of the two diameter cylinder, the first and the third cranks of the crank shaft from the end of the engine which the straight diameter cylinders of each V cylinder wing occupies, being aligned on one plane, the second and fourth cranks of the crank shaft from the end of the engine, which the straight diameter cylinders of each V-cylinder wing occupies, being aligned on a second plane, the two planes occupied by said cranks being in relation to each other, spaced apart circumferentially in degrees, less than diametrically opposite, whatever the angular relation is in degrees radially between the two rows of cylinders comprising the two V-wings of cylinder structure, means for directing a cooling air draft over the engine from the end in which the straight diameter cylinders are located and cooling fins on the said four cylinders and cylinder heads.

2. In a two stroke cycle internal combustion engine, four cylinders, two of the four cylinders having straight diameters and the other two of the cylinders having two diameters, pistons within each of the four cylinders and the pistons within the cylinders having two diameters having corresponding two diameter peripheries, a four throw crank shaft having the four cranks arranged with two throws in two different planes, the four cylinders being divided into two V-form cylinder units, a straight diameter cylinder and a two diameter cylinder comprising each unit, a single compression and combustion chamber joining the straight diameter cylinder and the chamber of the smaller diameter of the two diameter cylinder at the head ends and common to both, said chamber being formed in a removable cylinder head which is attached to both cylinders of each V-unit, a separate connection between the straight and two diameter piston of the two cylinders of each V-unit to the two cranks in one plane, cooling fins surrounding each of the cylinders of each V-unit and cooling fins extending across the cylinder head of each V-unit, said fins extending on a line parallel with the axes of the crank shaft.

3. In a V-type air cooled four cylinder two stroke cycle internal combustion engine, pistons arranged within each of the four cylinders, two of the four cylinders having straight diameters and two of the cylinders having two diameters, the larger chambers of the two diameter cylinders being adapted to gaseous fuel charge pumping, a common compression and combustion chamber joining the head of one of the straight diameter cylinders with one of the two diameter cylinders, one straight diameter cylinder and one two diameter cylinder comprising the unit of two cylinders arranged on a center line parallel with the axis of the crank shaft and forming one of the two V-wings, cooling fins surrounding the cylinders of the two cylinders comprising each V-unit, cooling fins extending over the cylinder heads, said fins extending on a line parallel with the axes of the crank shaft, a two plane crank shaft with separate connections between the pistons of the four cylinders and the respective cranks of said crank shaft, and the pistons of the two cylinders comprising each V-cylinder unit being connected to the two cranks of the said four crank shaft which are in one plane.

4. In a two stroke cycle internal combustion engine, four cylinders arranged to form a V-shaped structure with two cylinders in each wing thereof, one cylinder in each wing functioning as a combustion cylinder, the other cylinder in each wing functioning as a combustion cylinder and a gaseous fuel pumping cylinder for precompressing and pumping gaseous fuel to one of the combustion cylinders in the opposite wing of the V-structure, pistons arranged for operation within all four cylinders, a four-throw crank shaft, separate connections from the four pistons to the four throws of the crank shaft, two of the throws of said crank shaft occupying one longitudinal plane, the other two throws of said crank shaft occupying another longitudinal plane, the two planes that are occupied by the two pairs of throws being arranged at equidistant points from a longitudinal plane passing through the axis of the crank shaft, and the total number of degrees of angularity between the planes occupied by the two pairs of throws and the plane intersecting the axis of the crank shaft equalling the angular degrees between the planes occupied by the axes of the two sets of engine cylinders.

5. In a two stroke cycle internal combustion engine, four cylinders arranged to form a V-structure with two cylinders in each wing of said structure, one cylinder in each wing functioning as a combustion cylinder, the other cylinder in each wing functioning as a combustion cylinder and a gaseous fuel pumping cylinder, a duct from each gaseous fuel pumping cylinder to one of the combustion cylinders of the other wing, valvular means for controlling the admission of gaseous fuel into each pumping cylinder, pistons arranged for operation within the four cylinders, and a crank shaft having four throws to which the four pistons are, respectively, connected.

6. In a two stroke cycle internal combustion engine, four cylinders arranged to form a V-structure with two cylinders in each wing of said structure, one cylinder in each wing functioning as a combustion cylinder, the other cylinder in each wing functioning as a combustion cylinder and a gaseous fuel pumping cylinder, a duct from each gaseous fuel pumping cylinder to one of the combustion cylinders of the other wing, valvular means for controlling the admission of gaseous fuel into each pumping cylinder, pistons arranged for operation within the four cylinders, a crank shaft having four throws to which the four pistons are, respectively, connected, and a block positioned on the head end of each pair of cylinders, which block is provided with a common clearance chamber that connects the head ends of the combustion chambers in the two cylinders on which said block is positioned.

7. In a two stroke cycle internal combustion engine, four cylinders arranged to form a V-structure with two cylinders in each wing of said structure, one cylinder in each wing functioning as a combustion cylinder, the other cylinder in each wing functioning as a combustion cylinder and a gaseous fuel pumping cylinder, a duct from each gaseous fuel pumping cylinder to one of the combustion cylinders of the other wing, valvular means for controlling the admission of gaseous fuel into each pumping cylinder, pistons arranged for operation within the four cylinders, a crank shaft having four throws to which the four pistons are, respectively, connected, a block positioned on the head end of each pair of cylinders, which block is provided with a common clearance chamber that connects the head ends of the combustion chambers in the two cylinders on which said block is positioned, heat radiating fins formed on both pairs of cylinders and on the head blocks thereof, and means for directing air blasts longitudinally of said cylinders and the fins thereon.

8. In a two stroke cycle internal combustion engine, four cylinders arranged to form a V-shaped structure with two cylinders in each wing thereof, the cylinders in one wing being arranged so that they are staggered longitudinally with respect to the cylinders in the other wing, one cylinder in each wing functioning as a combustion cylinder, the other cylinder in each wing functioning as a combined combustion cylinder and gaseous fuel pumping cylinder, pistons arranged for operation within the four cylinders, and a crank shaft having four throws to which said pistons are, respectively, connected.

9. In a two stroke cycle internal combustion engine, four cylinders arranged to form a V-shaped structure with two cylinders in each wing thereof, the cylinders in one wing being arranged so that they are staggered longitudinally with respect to the cylinders in the other wing, one cylinder in each wing functioning as a combustion cylinder, the other cylinder in each wing functioning as a combined combustion cylinder and gaseous fuel pumping cylinder, pistons arranged for operation within the four cylinders, a crank shaft having four throws to which said pistons are, respectively, connected, a gaseous fuel transfer duct leading from each pumping cylinder to one of the combustion cylinders in the opposite wing of the V-structure, and valvular means actuated from the crank shaft for controlling the admission of gaseous fuel into the pumping cylinders.

In testimony whereof I affix my signature.

EVERETT R. BURTNETT.